Feb. 10, 1953  C. M. RUTLEDGE  2,628,108
COLLAPSIBLE CART

Filed Nov. 16, 1951  2 SHEETS—SHEET 1

INVENTOR.
Carl M. Rutledge
BY Brown, Jackson,
Boettcher & Dienner
Attys.

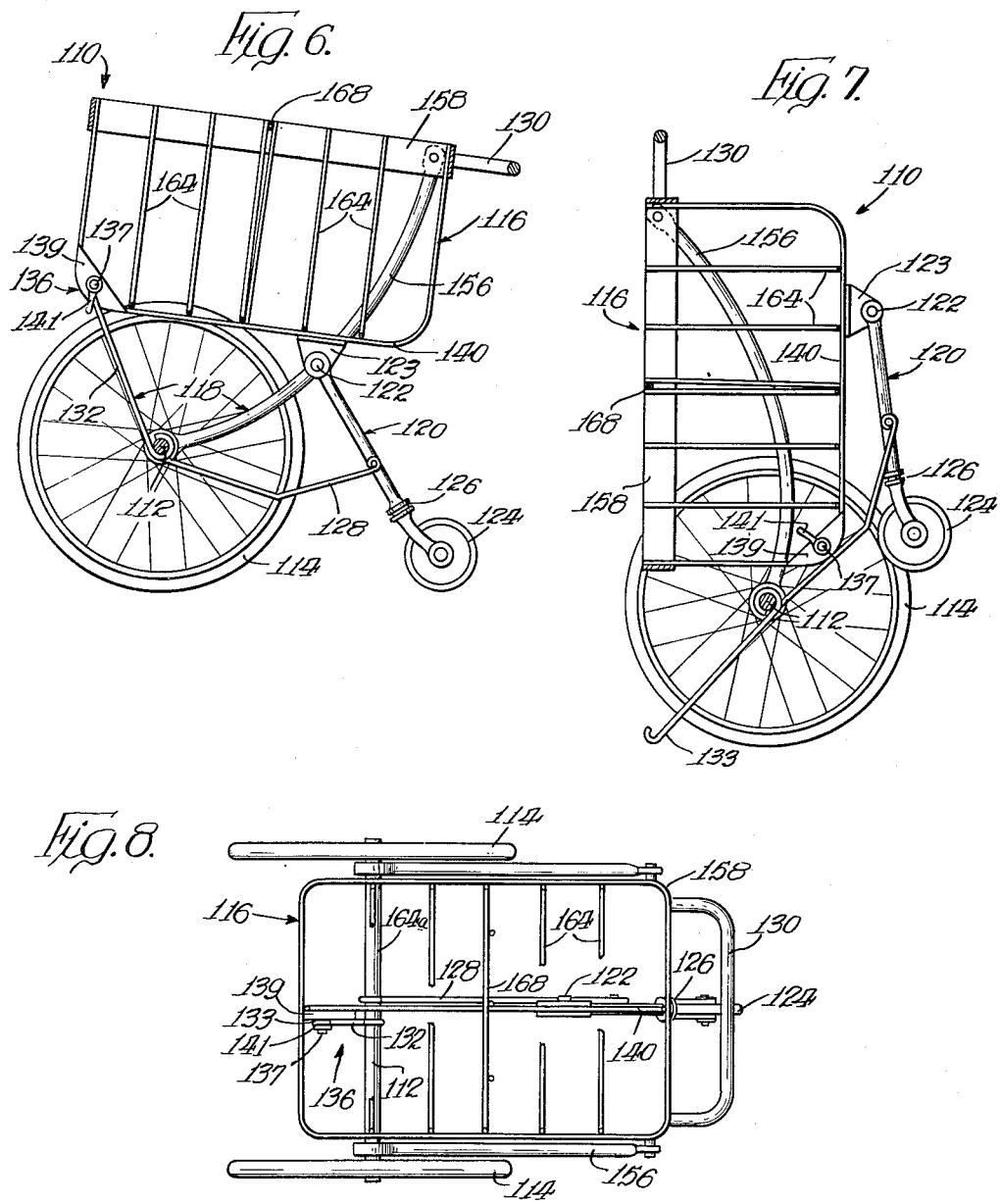

Patented Feb. 10, 1953

2,628,108

UNITED STATES PATENT OFFICE 2,628,108

COLLAPSIBLE CART

Carl M. Rutledge, Chicago, Ill.

Application November 16, 1951, Serial No. 256,630

3 Claims. (Cl. 280—41)

My invention pertains generally to an improvement in collapsible carts and more particularly to a cart which, in its expanded condition, provides support for articles at waist level with access to the load-carrying portion being had through the open top.

It is an object of my invention to provide such a collapsible cart which is lightweight so that, if desired, it may easily be lifted or may be conveniently suspended above the floor in collapsed position without requiring strong supporting means.

It is a further object to provide a cart which, while being lightweight, is strong and able to sustain daily rough handling without injury.

It is an advantage of the invention that the cart may be conveniently wheeled from place to place both in its collapsed and expanded positions and may negotiate narrow aisles and sharp corners. The cart may also be easily rolled over door sills, curbs, and the like, with little effort.

It is a further object of the invention to provide bracing and supporting means for the load-carrying portion which are simple in construction and, therefore, are less expensive to produce and assemble, all without sacrificing strength and maneuverability.

It is yet another object of this invention to provide a sturdy, lightweight load-carrying basket to which the bracing and supporting means is connected, which basket is compartmentalized in a convenient manner.

Other objects, uses and advantages of my invention will become apparent, or be obvious, from the following written description, when taken with the accompanying drawings, in which:

Figure 6 is a side elevation of a modification of the cart of Figure 1 with the nearer wheel removed and other portions broken away to show the structure behind;

Figure 7 is a side elevation of the cart of Figure 6 in collapsed position; and

Figure 8 is a top plan view of the cart of Figure 6 with portions of the structure being broken away to show the structure beneath.

Figure 1:
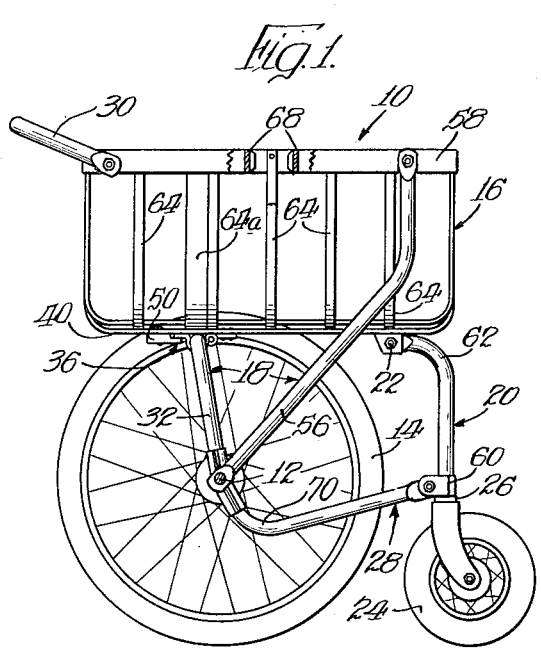
Figure 1 is a side elevation of the cart of my invention with the nearer wheel removed and an upper portion broken away to show the structure behind.

Turning now to Figures 1 through 5, the cart is indicated generally by the reference numeral 10. An axle 12 has a pair of wheels 14 supported adjacent opposite ends of the axle, said wheels being of the bicycle type, that is, having pneumatic, or semi-pneumatic, tires, and being of large diameter so that the cart 10 may be easily moved about and may easily traverse door sills, curbs, or the like. A load-carrying frame, or basket, is indicated generally by the reference numeral 16 and it is supported above the axle 12 by brace means, which are indicated generally by the reference numeral 18. A supporting member, indicated generally by the reference numeral 20, is hingedly, or pivotally, connected to the load-carrying frame, as at 22, and has at its lower end a ground-engaging wheel 24 which is swivelly connected, as at 26, with the supporting member 20. Preferably, strut means, indicated generally by the reference numeral 28, interconnect the supporting member 20 with the axle 12. A handle 30 is connected to the load-carrying frame, or basket, 16 adjacent one end thereof for manipulating the cart.

Referring now more particularly to the brace means 18, it will be seen that a portion of the brace means comprises a U-shaped tubular member 32 which has the free ends mounted in pairs of plates 34 (see Figure 5), which plates are pivotally connected to the axle 12, whereby the U-shaped brace means 32 may be swung away from the basket 16 when said brace means 32 is disconnected from the basket in a manner to be described. The width of the plates 34 is such that they provide extensive areas of engagement with the axle so that the bracing action is sturdy.

The bight portion of the U-shaped brace means 32 is adapted to be secured to the basket 16 by the latch means, which is indicated generally by the reference numeral 36. The latch means is shown in detail in Figure 4. Latch 36 comprises a mounting plate 38 secured to the central longitudinal metal strap 40, which forms a part of the basket 16, as by rivets 42; a U-shaped clamping element 44 having one arm encircling a horizontal pin 46 which is carried by the mounting plate 38 and having its other arm extended laterally, as at 48; together with a pivoted latching element 50 having an extension 52 adapted to be seated under the laterally extending arm 48 of the clamping element 44. When the latching element 50 is rotated about the vertical pin 54, which is carried in the strap member 40, the clamping member 44 may be swung downwardly about pin 46 as a center and the U-shaped brace member 32 may then be pivoted about the axle 12 to the position shown in Figure 2, so that the basket 16 may be put in collapsed position.

The brace means 18 also includes a pair of arms 56 which are pivotally connected at their lower ends to the axle 12 and are pivotally connected at their other ends to the basket, or load-carrying frame, 16. It will be observed that the arms 56 are pivotally connected to opposite sides of the basket 16 adjacent the top thereof by being secured to a strap element, or elements, 58 which defines the top of the basket 16. It will be observed that arms 56 of brace means 18 are pivotally connected to the basket 16 at a position substantially diagonally opposite from the latched position of the brace means 18 which is in the form of the U-shaped member 32. It will be observed that the connections with the load-carrying frame, or basket, 16 of the brace member 32 and arms 56 are on opposite sides of the axle 12. The basket 16 is thereby maintained in its horizontal position, aided by the support member 20.

Preferably, the U-shaped brace means 32 and brace means in the form of the arms 56, and also the support member 20, are formed of tubing, as also is the strut means 28. It will be observed that the free ends of the U-shaped brace member lie inwardly of the free ends of the strut means 28, along axle 12. Since strut means 28, through support member 20, is connected centrally of the basket, its free ends which are pivotally mounted on axle 12 will not shift longitudinally of the axle and will also center the arms of the U-shaped brace. The arms 56 of the brace means 18 extend downwardly along the basket in planes which are parallel to the sides of the basket.

A bracket 60 is connected to the support member 20 and the arms of the bracket have a pivotal, or hinged, connection with the strut means 28. The strut means 28, when taken with the bracket 60, is a generally U-shaped member, the free ends of the arms being pivotally connected to the axle 12 by pairs of plates 34a. While the support member 20 might consist solely of a vertical tubular member, the lower end of which would engage the ground, it is preferred to have the ground-engaging end include a wheel, such as the wheel 24, which has a swivel connection 26 with the supporting member 20. The wheel thus swivelly mounted provides for simplified manipulation of the cart and permits it to be wheeled about without raising the supporting member 20 from the ground. The larger wheels 14, together with the swivel wheel 24, permit the cart to be swung about on a very short radius, whereby it may negotiate narrow aisles and sharp corners.

It will be observed that the upper end of the supporting member 20 preferably is bent laterally and then hingedly connected, as at 22, to the basket 16. The bent end 62 rests against the central longitudinally extending strap 40 of the basket 16 and thereby limits the extent of the hinged movement of the support member 20 with respect to the basket 16. The strut means 28 also serves as a further limiting means.

Figure 3:
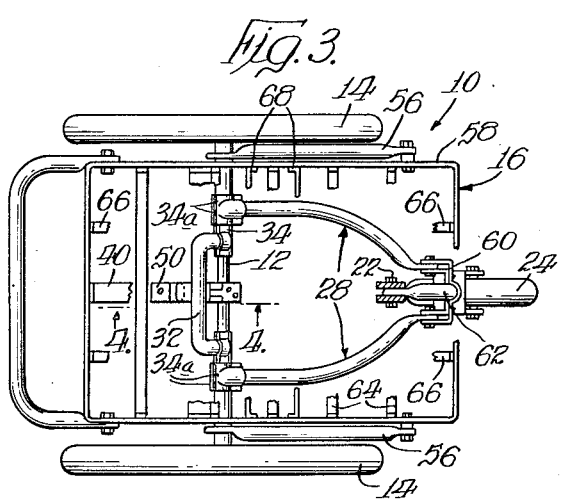
Figure 3 is a top plan view of the cart of Figure 1 with portions of the structure broken away.
Figure 4:
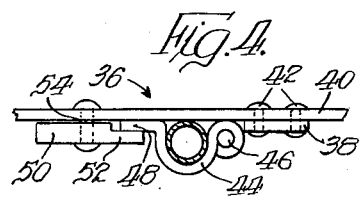
Figure 4 is an enlarged detail of the latching mechanism taken on the line 4—4 of Figure 3.
Figure 5:
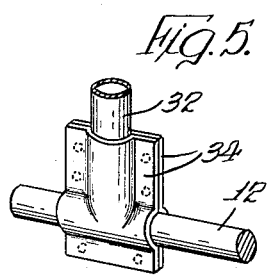
Figure 5 is an enlarged detail in perspective showing the connection of the brace means with the axle.

The basket, or load-carrying frame, 16 is preferably made of strap members such as the U-shaped strap members 64 which extend from the top strap, or straps, 58 down along the sides and across the bottom of the basket, together with the central longitudinally extending strap 40 and additional longitudinally extending U-shaped straps 66, which are best seen in Figure 3. One of the straps 64 (see 64a) is heavier than the others and intersects the heavier longitudinally extending strap 40 at a location where the brace means 32 is adapted to be connected to the basket 16.

Extending crosswise of the open top of the basket 16, is a pair of straps 68 (see Figures 1 and 3), which not only further strengthens the basket but also provides means for compartmentalizing the basket. The basket, as illustrated, is well adapted to receive containers in the form of canvas sacks, one fitting between the members 68 and larger ones on either side of straps 68. If preferred, solid end walls, bottom and side walls could be employed to form the basket, or load-carrying frame, 16.

Figure 2:
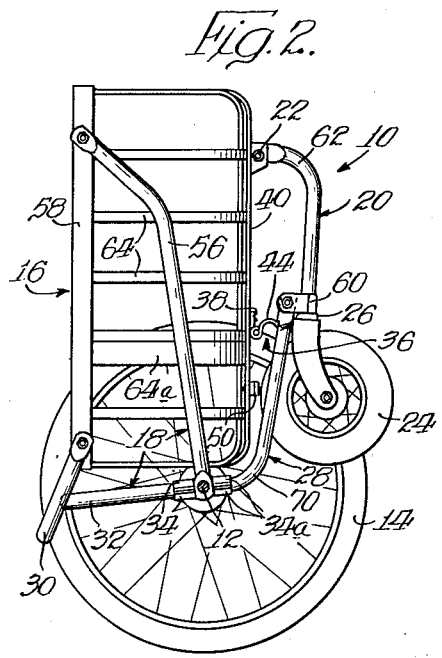
Figure 2 is a side elevation of the cart of Figure 1 in collapsed position.

When the cart is put in its collapsed position, as shown in Figure 2, it will be observed that the lowermost end of the basket 16 is positioned closely above the axle 12 and that the wheel 24 is drawn in between the larger wheels 14. On the opposite side from wheel 24 it will be seen that the handle 30 is also drawn in between the wheels 14. The cart is then in a collapsed, compact form but may yet be wheeled about on the wheels 14 by grasping the upper portion of the basket 16. It will be observed from Figures 1 and 2 that the strut means 28 is downwardly bent, as at 70, so that the strut means may fit about the corner of the basket 16 when it is in its collapsed position.

While the U-shaped brace means 32 is pivotally connected with the axle 12, the pivotal connection may be such that there is sufficient friction between the mounting plates 34 and axle 12 that the brace means 32 does not swing freely when released from the basket 16. It will then be pushed to the position shown in Figure 2, when it is desired to collapse the cart. However, it will be observed that the radial length of the brace means 32 is shorter than the radius of the wheels 14, so that, even if the brace means 32 is swung to its lowermost position, it will not drag on the ground.

Referring now to the modified form of the cart shown in Figures 6, 7 and 8, it will be observed that, in general, the structure is similar and for such elements of the cart as are identical, or similar, corresponding reference numerals in the "100" series have been employed. The basket 116 is generally formed of metal rod in place of straps and the handle 130 is connected to the opposite end of the basket 116 from the end at which the handle 30 is connected to the basket 16 of Figure 1. The arms 156 of the brace means 118 curve from the axle toward the handle 130 and are connected closer to the end of the basket 16 than are the arms 56 in the case of Figure 1. In place of the U-shaped brace means 32 of Figure 1, it will be seen that a single metal rod 132 is pivotally connected to the axle 112 and at its upper end has a hook 133 (see Figure 7) which is adapted to fit over a pin 137 of the latch means 136. The pin 137 is connected to a plate 139, which, in turn, is secured to the bars going to make up basket 116. The pin 137 is threaded at its free end and receives a threaded clamping arm 141 which may be threaded onto the pin 137 to hold the hooked end 133 of the brace means 132 between it and the plate 139. It will be understood that other latch means than those shown in Figures 1 and 6 may be employed.

The supporting member 120 in Figure 6 is inclined at an angle with respect to the ground and it is pivotally connected, as at 122, to a bracket 123 which depends from the central longitudinally extending rod 140 of the basket 116. The strut means 128 comprises a single rod pivotally connected at one end to the axle 112 and at the other end to the supporting member 120.

While I have shown a preferred embodiment of the invention, I do not intend to be limited thereto except as the appended claims are so limited, since various changes and modifications coming within the scope of the invention will suggest themselves to others by reason of my disclosure.

I claim:

1. In a collapsible cart, in combination, an axle, a pair of wheels supported adjacent opposite ends of said axle, a load-carrying frame disposed above the axle, brace means pivotally connected by their one ends to said axle and connected by their other ends with said frame at spaced apart points, said brace means being connected adjacent the lower portion of said frame at one location and adjacent the upper portion of said frame at another location, the connection with the lower portion of said frame being disconnectable and the connection adjacent the upper portion of said frame being pivoted, whereby the end of the frame having the lower connection may, following disconnection, be swung downwardly between the wheels closely above the axle into a generally vertical position to place the cart in collapsed position, and latch means disposed beneath said frame, the brace means connected with the lower portion of the frame being selectively connectable with the frame at its under side by said latch means.

2. In a collapsible cart, in combination, an axle, a pair of wheels supported on said axle, a load-carrying frame disposed above the axle, brace means pivotally connected by their one ends with said axle and connected by their other ends with said frame at spaced apart points, a support member pivotally connected by its one end with said frame adjacent the end of the latter and adapted to engage the ground by its other end, and means limiting the pivotal movement of said support member, said limiting means including a bent end of said support member adjacent its pivoted connection with said frame, said bent end engaging the underside of said frame.

3. In a collapsible cart, in combination, an axle, a pair of wheels supported on said axle, a load-carrying frame disposed above the axle, brace means pivotally connected by their one ends with said axle and connected by their other ends with said frame at spaced apart points, a support member pivotally connected by its one end with said frame adjacent an end of the latter and adapted to engage the ground by its other end, and means limiting the pivotal movement of said support member, said limiting means comprising strut means pivotally connected by its opposite ends with said axle and said support member, said strut means having a downwardly directed bend, said bend being adapted to fit about a corner of the frame when the cart is in collapsed position.

CARL M. RUTLEDGE.

REFERENCES CITED

The following references are of record in the file of this patent:

UNITED STATES PATENTS

| Number | Name | Date |
|---|---|---|
| 1,573,884 | Weatherell | Feb. 23, 1926 |
| 2,583,514 | Maslow | Jan. 22, 1952 |

FOREIGN PATENTS

| Number | Country | Date |
|---|---|---|
| 7,982 | Great Britain | of 1904 |
| 71,864 | Norway | Mar. 24, 1947 |
| 558,399 | Great Britain | Jan. 4, 1944 |